United States Patent
Parnell (10) Patent No.: US 9,391,668 B2
(45) Date of Patent: Jul. 12, 2016

(54) METHOD AND APPARATUS FOR REDUCING THE POWER OF A SIGNAL ELECTROMAGNETICALLY COUPLED FROM A PLC MEDIUM TO A DSL MEDIUM

(75) Inventor: Robert S. Parnell, San Jose, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 14/365,604

(22) PCT Filed: Dec. 15, 2011

(86) PCT No.: PCT/US2011/065279
§ 371 (c)(1),
(2), (4) Date: Jun. 13, 2014

(87) PCT Pub. No.: WO2013/089757
PCT Pub. Date: Jun. 20, 2013

(65) Prior Publication Data
US 2014/0369430 A1    Dec. 18, 2014

(51) Int. Cl.
*H04B 3/00* (2006.01)
*H04B 3/54* (2006.01)
(Continued)

(52) U.S. Cl.
CPC .. *H04B 3/54* (2013.01); *H04B 3/32* (2013.01); *H04B 17/345* (2015.01); *H04M 3/34* (2013.01);
(Continued)

(58) Field of Classification Search
CPC ................ H04B 2203/5445; H04B 2203/5491
USPC ......................................................... 375/257
See application file for complete search history.

(56) References Cited

U.S. PATENT DOCUMENTS

2006/0274893 A1   12/2006  Cioffi et al.
2008/0260003 A1*  10/2008  Baudais ........................ 375/146
(Continued)

FOREIGN PATENT DOCUMENTS

WO    2006129143 A1   12/2006
WO    WO-2010019486    2/2010
WO    WO-2012018289    2/2012

OTHER PUBLICATIONS

"Dynamic Spectrum Management for Mixtures of Vectored and Non-Vectored DSL Systems," by Mehdi Mohseni, et al, from the 14th Annual Conference on Information Sciences and Systems, 6 pages.
(Continued)

Primary Examiner — David S Huang
(74) Attorney, Agent, or Firm — Green, Howard & Mughal, LLP (57) ABSTRACT

Reducing a power of a signal electromagnetically coupled from a PLC medium to a digital subscriber line (DSL) medium. The method involves transmitting a data signal over the PLC medium at a first average power level from one of a plurality of PLC transmitters coupled to the PLC medium, then measuring first noise associated with a first signal received at a DSL receiver coupled to the DSL communication medium caused at least in part by the data signal transmitted over the PLC medium at a second average power level from the one PLC transmitter, the second average power level different than the first average power level, followed by measuring second noise associated with a second signal received at the DSL receiver coupled to the DSL communication medium caused at least in part by the data signal transmission over the PLC medium at the second average power level. A transmit power spectral density (PSD) for the data signal transmitted by the one PLC transmitter over the PLC medium is then changed, based on a difference between the first noise and the second noise, such that the changed transmit PSD for the data signal transmitted by the one PLC transmitter over the PLC medium reduces the power of the signal electromagnetically coupled from the PLC medium to the DSL medium caused by the data signal transmission from the one PLC transmitter over the PLC medium.

21 Claims, 2 Drawing Sheets

(51) Int. Cl.
  *H04B 3/32* (2006.01)
  *H04M 3/34* (2006.01)
  *H04W 52/22* (2009.01)
  *H04M 3/51* (2006.01)
  *H04B 17/345* (2015.01)
  *H04W 52/34* (2009.01)
  *H04M 11/06* (2006.01)

(52) U.S. Cl.
  CPC ............ *H04M 3/5166* (2013.01); *H04M 11/06* (2013.01); *H04W 52/225* (2013.01); *H04B 2203/5425* (2013.01); *H04B 2203/5495* (2013.01); *H04M 11/062* (2013.01); *H04W 52/346* (2013.01); *Y02B 60/50* (2013.01)

(56) References Cited

U.S. PATENT DOCUMENTS

| | | | |
|---|---|---|---|
| 2010/0135482 A1* | 6/2010 | Jagannathan et al. | ... 379/406.06 |
| 2010/0232486 A1 | 9/2010 | Starr et al. | |
| 2011/0110409 A1 | 5/2011 | Sands et al. | |
| 2011/0150057 A1 | 6/2011 | Anschutz et al. | |
| 2011/0268258 A1* | 11/2011 | Alloin et al. | ............... 379/32.04 |
| 2012/0027060 A1 | 2/2012 | Singh et al. | |
| 2012/0140901 A1 | 6/2012 | Tennyson et al. | |
| 2015/0023494 A1 | 1/2015 | Fisher et al. | |

OTHER PUBLICATIONS

"System for Diagnosing and Optimizing Vectored DSL Lines," by Kerpez et al., dated May 26, 2011, 9 pages.

"CuPON: The Copper Alternative to PON 100 Gb/s DSL Networks," by Cioffi et al., from IEEE Communications Magazine, Jun. 2007, 8 pages.

International Search Report and Written Opinion for International Patent Application No. PCT/US2011/065279, Mailed Aug. 2, 2012.

International Search Report and Written Opinion for International Patent Application No. PCT/US2012/029677, Mailed Dec. 10, 2012.

Maes, Jochen, et al., "Spectral Compatibility of In-Home and Access Technologies", Power Line Communications and Its Applications (ISPLC), 2011 IEEE International Symposium on, IEEE, Apr. 3, 2011, pp. 7-11.

Moulin, Fabienne, et al., "PLC and VDSL2 Coexistence", Power Line Communications and Its Applications (ISPLC), 2010 IEEE, International Symposium On, IEEE, Piscataway, NJ, USA, Mar. 28, 2010, pp. 207-212.

International Preliminary Report on Patentability for International Patent Application No. PCT/US2012/029677, dated Oct. 2, 2014, 7 pages.

International Preliminary Report on Patentability for International Patent Application No. PCT/US2011/065279, mailed Jun. 26, 2014.

Notice of Allowance for U.S. Appl. No. 14/385,679, mailed Feb. 12, 2015.

First Examination Report for Australian Patent Application No. 2011383259, mailed Jan. 23, 2015.

Supplemental Notice of Allowability for U.S. Appl. No. 14/385,679 mailed Mar. 23, 2015.

First Examination Report for Australian Patent Application No. 2012374062, mailed Mar. 20, 2015.

First Office Action for Chinese Patent Application No. 201180076364.2, mailed Apr. 21, 2015.

First Office Action for Chinese Patent Application No. 201280072524.0, mailed May 26, 2015.

Non-Final Office Action for Japanese Patent Application No. 2014-547157, mailed Jun. 30, 2015.

First Office Action mailed Oct. 6, 2015 for Japanese Patent Application No. 2015/501633.

"Self-FEXT cancellation (Vectoring) for use with VDSL2 transceivers; G.993.5 (2010) Amendment 4 (Aug. 2013)", ITU-T Standard, International Telecommunication Union, Geneva; CH, No. G.993.5((2010)—Amendment) <4>, Aug. 29, 2013, pp. 1-18, XP017588333.

Non-Final Office Action mailed Oct. 15, 2015, for U.S. Appl. No. 14/740,123.

* cited by examiner

METHOD AND APPARATUS FOR REDUCING THE POWER OF A SIGNAL ELECTROMAGNETICALLY COUPLED FROM A PLC MEDIUM TO A DSL MEDIUM

CLAIM OF PRIORITY

This application is a U.S. National Phase application under 35 U.S.C. §371 of International Application No. PCT/US2011/065279, filed Dec. 15, 2011, entitled "METHOD AND APPARATUS FOR REDUCING THE POWER OF A SIGNAL ELECTROMAGNETICALLY COUPLED FROM A PLC MEDIUM TO A DSL MEDIUM" the entire contents of which are incorporated herein by reference.

FIELD OF THE INVENTION

The invention relates to Digital Subscriber Line technology. In particular, embodiments of the invention relate to an apparatus and method for reducing electromagnetic coupling from a power line communication (PLC) medium to a digital subscriber line (DSL) communication medium.

BACKGROUND OF THE INVENTION

The Phenomenon: Electromagnetic Coupling Between PLC and DSL

We consider the case where the following statements are both true:
  A premise contains a point of termination for digital subscriber line (DSL), defined here as ITU G.993.1, ITU G.993.2, or a similar multi-tone-modulated protocol.
  The same premise employs power line communications (PLC), defined here as HomePlug AV, ITU G.hn, or a similar protocol, whose implementation provides a means for shaping the transmit power spectral density (PSD).

The physical medium for DSL is typically voice-grade telephone cable or data-grade cable such as Cat5. The physical medium for PLC is typically the electric power wiring of the premise.

Although DSL and PLC signals nominally travel on separate physical media that are not intentionally coupled, the media nonetheless are coupled electromagnetically to some extent. Field testing by the inventor and independent parties confirms what stands to reason: that the media couple to an extent determined by physical factors that differ from premise to premise and from location to location within the premise.

If DSL and PLC had disjoint spectra, then parasitic coupling between them might be inconsequential. However, the spectra of DSL and PLC are not disjoint. They overlap at 2 MHz and above. Testing confirms what stands to reason: that parasitic coupling is sufficient at some premises, at some locations, to degrade performance significantly.

We address the case of PLC parasitically coupling into DSL. This case is of more practical concern than the reverse case because of the following:
  PLC has no analogue to DSL's time-consuming training phase. PLC essentially trains continually as it carries traffic.
  PLC was designed to operate on a more-hostile medium than DSL: power line versus phone line.
  PLC signal is time-division-multiplexed. PLC transmit duty cycle varies according to traffic and approaches zero when there is no traffic. DSL signal, by contrast, is frequency-division-duplexed. DSL transmit duty cycle in both directions is 100%, independent of traffic.

Therefore, it should be easier for PLC to adapt automatically to coupled DSL than the reverse.

Therefore, it seems more fruitful to adjust PLC to get it out of DSL's way than to adjust DSL to get it out of PLC's way.

It stands to reason, and testing confirms, that:
  The coupling is highly frequency-dependent. Some frequencies couple much more strongly than others.
  The coupling is substantially linear versus power level. Scaling the transmitted power by β results in scaling the coupled power by β.
  The coupling can be modeled as a frequency-dependent "transfer function" that specifies the ratio of coupled power at DSL receiver to output power at PLC transmitter.
  There is a distinct transfer function from each power receptacle in the premise to each phone jack in the premise. Therefore, at each premise, each PLC transmitter has a distinct transfer function to the DSL receiver.

It stands to reason that the transmissions of PLC could couple strongly enough into the DSL to cause disturbances such as retraining and uncorrectable bit errors. Retraining of the DSL is not guaranteed to be effective. It is not guaranteed to adapt DSL to PLC successfully, because PLC transmissions are sporadic, and PLC transmissions may enter a lull while the retraining is performed. Subsequent PLC transmissions might cause retraining again. Even if successful, retraining to accommodate PLC might yield an unacceptably low DSL bit rate.

Tests performed by independent parties show that coupling from PLC into DSL can reduce the quality of service of DSL to below the minimum level needed to provide acceptable performance for the intended application, such as IPTV. Parasitic coupling of PLC into DSL is a phenomenon of practical and commercial consequence.

BRIEF DESCRIPTION OF THE FIGURES

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

SUMMARY OF THE INVENTION

Mitigating the Phenomenon

Embodiments of the invention disclosed herein mitigate the phenomenon of PLC coupling into DSL. Embodiments of the invention customize the transmit Power Spectral Density (PSD) of each PLC node so as to reduce each PLC node's influence on DSL to a level that allows DSL to meet specified performance criteria.

Customizing a PLC node's PSD involves shaping it downward. If a PLC node's transmit PSD is shaped downward, then that node's egress PHY rates to its peer PLC nodes may decrease as a side effect. We can predict the decrease by examining the PLC node's present bit loadings to its peer nodes, estimating the decreases in per-tone signal-to-noise ratio (SNR) at the peers' receivers that would result from the PSD change, and then estimating the reduced bit loadings, and hence the reduced PHY rates.

If any of the predicted egress PHY rates, or any of the actual, resulting egress PHY rates, is less than the system can tolerate, then we can lower the DSL performance target and compute a new, less-stringent PSD for that node. In uncommon cases where we can't achieve both acceptable DSL performance and acceptable PLC performance, we can prescribe a relocation of the PLC node.

One feature of an embodiment disclosed here is that it yields a distinct transmit PSD for each PLC node on the premise. By contrast, a less sophisticated technique might apply a common, "one-size-fits-all", DSL-friendly PSD to all PLC nodes that are to coexist with DSL. A common PSD would be overly conservative, making overall performance of PLC in the premise be significantly less than it could be and perhaps insufficient for the application.

DETAILED DESCRIPTION OF THE INVENTION

Overview

Figure 2:
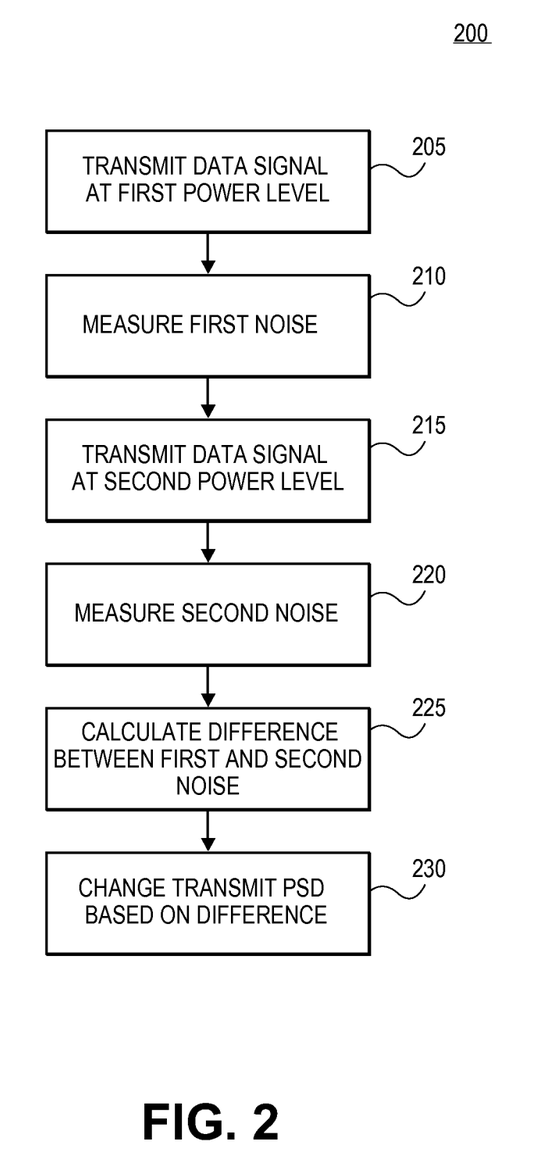
FIG. 2 illustrates a flow chart of an embodiment of the invention.

According to one embodiment of the invention, and with reference to FIG. 2, the power of a signal electromagnetically coupled from a PLC medium to a digital subscriber line (DSL) medium is reduced. A general description of the basic aspects of the embodiment is provided here, with more detailed discussion on each aspect provided later, in the written description. The embodiment 200 begins at 205 with transmitting a data signal over the PLC medium at a first average power level from one of a plurality of PLC transmitters coupled to the PLC medium. In one embodiment, the data signal is transmitted at an average power level that is substantially greater than the combined power output of all other data signals concurrently transmitted by PLC transmitters in the plurality of PLC transmitters. In one embodiment, this is accomplished by transmitting the data signal at an average power level while all other PLC transmitters in the plurality of PLC nodes are not transmitting a data signal. In one embodiment, the data signal is transmitted at a maximum average power level at which the PLC transmitter transmits the data signal. At 210, the embodiment measures noise associated with a first signal received at a DSL receiver coupled to the DSL communication medium caused at least in part by the data signal transmission over the PLC medium at the first average power level. In one embodiment, the noise may be measured in terms of a Signal-to-Noise ratio (SNR), or in another embodiment, it may be measured according to DSL quiet-line noise (QLN).

The embodiment again transmits a data signal over the PLC medium at 215, but this time at a second average power level, from the same PLC transmitter. The second average power level is different than the first average power level. In one embodiment, the data signal is transmitted at an average power level that is substantially greater than the combined power output of all other data signals concurrently transmitted by PLC transmitters in the plurality of PLC transmitters. In one embodiment, just as described above when transmitting the first data signal at an average power level, this is also accomplished by transmitting the data signal at an average power level while all other PLC transmitters in the plurality of PLC nodes are not transmitting a data signal. In one embodiment, the second average power level is a minimum average power level at which the PLC transmitter transmits the data signal, for example, an average power level of zero.

At 220, the embodiment measures the noise, for example, the embodiment measures SNR, associated with a second signal received at the DSL receiver coupled to the DSL communication medium caused at least in part by the data signal transmission over the PLC medium at the second average power level. In another embodiment, the noise may be measured according to DSL quiet-line noise (QLN).

Given the first and second noise measurements, the embodiment calculates at 225 the difference between the two measurements, and at 230, changes the transmit power spectral density (PSD) for the data signal transmitted by the PLC transmitter over the PLC medium, based on the calculated difference between the first noise and the second noise measurements. In this way, the changed transmit PSD for the data signal transmitted by the PLC transmitter over the PLC medium reduces the power of the signal electromagnetically coupled from the PLC medium to the DSL medium caused by the data signal transmission from the PLC transmitter over the PLC medium. In one embodiment, changing the transmit power spectral density (PSD) for the data signal transmitted by the PLC transmitter involves adjusting a vector that specifies a nominal transmit power for the data signal.

The Parameter: The Amplitude Map

In order to shape a PLC node's transmit PSD, an embodiment of the invention adjusts the "amplitude map", defined here as a vector that specifies the nominal PLC transmit power at each PLC tone or each of several groups of adjacent tones transmitted by the PLC node. Typical PLC protocols and chipsets have a parameter that can be made to fit our definition of "amplitude map". Additional notes about the amplitude map:

- Typically it is implemented in nonvolatile memory in the PLC node, but an alternative embodiment can handle both volatile and nonvolatile memory implementations.
- It may be read and written locally, remotely, or both, by management messages that may be protocol-specific or chipset-specific.
- In one embodiment, each PLC node has an independent amplitude map. Typical PLC protocols and chipsets meet this requirement.
- Whether its value units are absolute or relative does not matter, because embodiments assume that the value units are relative.
- It stands to reason that the greater its frequency precision, the better the results. A typical precision found in PLC protocols and chipsets is one element per PLC tone. Embodiments can be adapted to use any frequency precision.
- It stands to reason that the greater its value precision, the better the results. An embodiment may make use of the maximum value precision available to it.
- It stands to reason that the greater its value range, the better the results. An embodiment uses the maximum value range available to it.

The Measurement: DSL SNR

Computing a more-DSL-friendly transmit PSD for a particular PLC node is founded on measuring the coupling from that PLC node to the DSL receiver. One embodiment of the invention measures coupling indirectly by collecting and processing DSL signal noise measurements, for example, Signal-to-Noise Ration (SNR) measurements, under various distinct PLC-transmission cases. References to SNR or measurement thereof hereinafter shall be understood to include, more generally, signal noise, or any measure of signal noise. Notes about the DSL SNR:

- It may be read locally, remotely, or both, via some management messages that may be specific to the make, model, and version of the DSL equipment.
- It stands to reason that the greater its frequency precision, the better the results. A typical precision is one element per DSL tone. Embodiments of the invention can be adapted to any frequency precision.

It stands to reason that the greater its value precision, the better the results. An embodiment uses the maximum value precision available to it.

It is shown in the Analysis, Part 1 section below that two DSL SNR measurements, performed while a PLC node is transmitting solo at two distinct power levels, are sufficient to compute a new, DSL-friendly PSD for that PLC node. For now, we call the power levels $P_z$ and $P_a$, where $P_z$ is less than $P_a$. We retrieve the corresponding SNR readings, $SNR_z$ and $SNR_a$, directly or indirectly from the DSL receiver.

According to one embodiment, the PLC node transmits "artificial traffic" at average power levels $P_z$ and $P_a$, rather than, say, waiting for the PLC node to transmit "natural traffic".

We have mentioned "the DSL receiver", but in fact there are two DSL receivers in the system: One in the customer-premises equipment (CPE) and one in the DSLAM in the central office or field cabinet. The CPE measures downstream SNR, and the DSLAM measures upstream SNR. In practice, only the weak, downstream signal is affected by coupled PLC signal; the upstream signal is unaffected. Nonetheless, in one embodiment, the downstream and upstream SNR need not be segregated. Furthermore, the embodiment does not require knowledge of which DSL tones are upstream and which are downstream.

To maximize accuracy of the SNR measurements, we observe the following principles while collecting the SNR data:

We choose $P_z$ and $P_a$ to be much larger than the combined power outputs of all other PLC nodes. Ideally, we accomplish this in part by causing all other PLC transmitters to be nominally silent or by waiting for them to be so.

We make $P_a$ larger than $P_z$ by as much as practical. Ideally, we make $P_a$ be the maximum that complies with system constraints, and we make $P_z$ be the absolute minimum, which is zero.

We can realize $P_z$ and $P_a$—that is, regulate transmitter output power of a PLC node to $P_z$ and $P_a$—by the following means, whose effects combine multiplicatively:

By regulating the transmit duty cycle.

By temporarily altering the node's amplitude map.

In one embodiment, we regulate transmit power during SNR measurements solely by regulating the transmit duty cycle.

Analysis, Part 1: Single PLC Transmitter

The equations in this section derive a formula for modifying the amplitude map of a PLC node based on two per-tone DSL SNR measurements performed with that PLC node transmitting at two distinct power levels while all other PLC nodes are nominally silent. Notes concerning these equations:

Variables and operators can be considered either vector—having one element per DSL or PLC tone—or scalar—being for any individual DSL or PLC tone.

All vector-on-vector arithmetic, including equality and inequality comparisons, denotes element-by-element arithmetic. The input vectors and the resultant vector are of the same size.

We define the following vector, which is the difference between two DSL SNR measurements made with a PLC node transmitting solo at power levels $P_z$ and $P_a$:

$$D_{za} = SNR_z - SNR_a \quad (1)$$

$D_{za}$ is the decrease in DSL SNR that occurs when the PLC node transitions from transmitting at the lesser power, $P_z$, to transmitting at the greater power, $P_a$. Nominally—that is, in the absence of imperfections in the SNR measurements—$D_{za}$ is positive or zero.

We define the following additional vectors:

H=power in coupled PLC signal. H replaces P in our analysis henceforth.

S=power in received DSL signal.

B=power in background noise, which excludes coupled PLC signal.

These powers are as seen by the DSL receiver. It will be shown that their ratios are important, but not their absolute values.

We note that $SNR_z$, $SNR_a$, and $D_{za}$ are in the dB domain and that H, S, and B are in the linear domain. We introduce the following notation to bridge the two domains:

$$dB\ \text{domain} \leftarrow \text{linear domain} \quad (2)$$

We assume that PLC signal appears as additive noise to each DSL tone. We express the two SNRs literally, as ratios of signal power to total noise power.

$$SNR_z \leftarrow \frac{S}{H_z + B} \quad (3)$$

$$SNR_a \leftarrow \frac{S}{H_a + B} \quad (4)$$

We take the difference of the two SNRs as in Equation (1). We note that subtraction in the dB domain corresponds to division in the linear domain.

$$SNR_z - SNR_a \leftarrow \frac{\left(\frac{S}{H_z + B}\right)}{\left(\frac{S}{H_a + B}\right)} \quad (5)$$

$$SNR_z - SNR_a \leftarrow \frac{H_a + B}{H_z + B} \quad (6)$$

We substitute Equation (1) into Equation (6):

$$D_{za} \leftarrow \frac{H_a + B}{H_z + B} \quad (7)$$

We define $H_X$ to be the coupled power that would result if the PLC node were transmitting at 100% duty cycle under its current amplitude map. Each PLC node has a distinct $H_X$, which depends upon:

The coupling transfer function from the PLC transmitter to the DSL receiver: We cannot affect this other than by prescribing physical changes such as relocating the PLC transmitter or the DSL receiver.

The analog signal path of the PLC transmitter: We cannot affect this, but we can consider this to be part of the coupling transfer function.

The amplitude map of the PLC transmitter: We control this.

We define $\tau$ to be the fraction of $H_X$ that is coupled, given the actual duty cycle and amplitude map. We substitute $\tau$ and $H_X$ into Equation (7) and rearrange:

$$D_{za} \leftarrow \frac{\tau_a H_X + B}{\tau_z H_X + B} \quad (8)$$

$$D_{za} \leftarrow \frac{\tau_a\left(\frac{H_X}{B}\right) + 1}{\tau_z\left(\frac{H_X}{B}\right) + 1} \quad (9)$$

We define $\alpha_X$:

$$\alpha_X \equiv \frac{H_X}{B} \quad (10)$$

Because each PLC node has a distinct $H_X$, each node has a distinct $\alpha_X$. We substitute $\alpha_X$ into Equation (9), and we solve for $\alpha_X$:

$$D_{za} \leftarrow \frac{\tau_a \alpha_X + 1}{\tau_z \alpha_X + 1} \quad (11)$$

$$10^{\left(\frac{D_{za}}{10}\right)} = \frac{\tau_a \alpha_X + 1}{\tau_z \alpha_X + 1} \quad (12)$$

$$\alpha_X = \frac{10^{\left(\frac{D_{za}}{10}\right)} - 1}{\tau_a - \tau_z 10^{\left(\frac{D_{za}}{10}\right)}} \quad (13)$$

We compute $\alpha_X$ of a PLC node using Equation (13) with SNR measurements made under $\tau$ that are convenient to realize, $\tau_z$ and $\tau_a$. Using $\alpha_X$, we can estimate the difference in SNR that would result for any other pair of $\tau$. The pair of $\tau$ of most interest is $\tau_a$=100%, $\tau_z$=0%. 100% represents the conservative worst case, where the PLC node is transmitting continuously under its present amplitude map. 0% yields the best case, where there is no PLC transmission. We substitute this pair of duty cycles into Equation (11), and we define $D_X$ to be the resulting value of $D_{za}$.

$$D_X \leftarrow \frac{1\alpha_X + 1}{0\alpha_X + 1} \quad (14)$$

Simplifying Equation (14), we obtain formulae predicting the worst-case decrease in DSL SNR that could be caused by the PLC node:

$$D_X \leftarrow \alpha_X + 1 \quad (15)$$

$$D_X = 10 \log_{10}(\alpha_X + 1) \quad (16)$$

Each PLC node obviously has a distinct $D_X$ since each node has a distinct $\alpha_X$.

Substituting Equation (13) into Equation (16), we obtain a formula for $D_X$ in terms of measured quantities:

$$D_X = 10 \log_{10}\left(\frac{10^{\left(\frac{D_{za}}{10}\right)} - 1}{\tau_a - \tau_z 10^{\left(\frac{D_{za}}{10}\right)}} + 1\right) \quad (17)$$

If we judge that $D_X$, the worst-case decrease in DSL SNR causable by the PLC node, would yield unacceptable DSL performance, then we adjust the PLC node's amplitude map to give the PLC node a new $\alpha$—call it $\alpha_Y$—to yield a new, acceptable D—call it $D_Y$.

The relation between $D_Y$ and the corresponding $\alpha_Y$ is obviously the same as for $D_X$ and $\alpha_X$ in Equation (15). The relationship is as follows:

$$D_Y \leftarrow \alpha_Y + 1 \quad (18)$$

We convert the LHS's of Equations (18) and (15) from the dB domain to the linear domain, then rearrange:

$$\alpha_Y = 10^{\left(\frac{D_Y}{10}\right)} - 1 \quad (19)$$

$$\alpha_X = 10^{\left(\frac{D_X}{10}\right)} - 1 \quad (20)$$

We seek a formula for adjusting a PLC node's amplitude map to change the node's a from $\alpha_X$ to $\alpha_Y$. We know intuitively that the appropriate adjustment is a scaling, so we seek an expression that involves the ratio of the new amplitude map to the old amplitude map. Using the definition of $\alpha$, we note the following:

$$\alpha_Y \equiv \frac{H_Y}{B} \quad (21)$$

$$\alpha_X \equiv \frac{H_X}{B} \quad (22)$$

$$\frac{\alpha_Y}{\alpha_X} = \frac{\left(\frac{H_Y}{B}\right)}{\left(\frac{H_X}{B}\right)} \quad (23)$$

$$\frac{\alpha_Y}{\alpha_X} = \frac{H_Y}{H_X} \quad (24)$$

The RHS is of Equation (24) a special quantity. It is the amount by which the PLC node's coupled power, and hence its amplitude map, is scaled. This is the scale factor we seek. We define this scale factor as $\beta$:

$$\beta \equiv \frac{H_Y}{H_X} \quad (25)$$

We construct some useful formulae for $\beta$:

$$\beta = \frac{\alpha_Y}{\alpha_X} \quad (26)$$

$$\beta = \frac{10^{\left(\frac{D_Y}{10}\right)} - 1}{10^{\left(\frac{D_X}{10}\right)} - 1} \quad (27)$$

$$\beta = \frac{10^{\left(\frac{D_Y}{10}\right)} - 1}{\alpha_X} \quad (28)$$

If we wish to change the PLC transmitter's worst-case impact on DSL SNR from $D_X$ to $D_Y$, we must scale its amplitude map by $\beta$.

We can calculate β using the formula in Equation (28), for example. The inputs to this formula are $D_Y$ and $\alpha_X$:

We specify $D_Y$. $D_Y$ can be as simple as a constant value over all tones, such as 1 dB, or it can be more elaborate.

We calculate $\alpha_X$ from SNR measurements using Equation (13).

Notes on the formula for θ in Equation (27):

The formula has a singularity at $D_X=0$. This singularity is inconsequential, because if $D_X$ were zero, then that would indicate no measurable PLC-to-DSL coupling and thus no need to compute a non-unity scale factor for the PLC transmit power.

The formula is useless for $D_X<0$, since $D_X<0$ is physically unattainable. But it should be noted that measurement errors might cause $D_X<0$.

The formula is useless for $D_Y<0$, since $D_Y<0$ is physically unattainable and thus illegal to specify.

The formula has a zero at $D_Y=0$. The physical interpretation is that for PLC to have completely zero effect on DSL SNR, its amplitude at its source must be zero.

The formula is valid and physically meaningful whether $D_Y$ is greater than, less than, or equal to $D_X$. If $D_Y>D_X$, then $13>1$, which implies an increase in the amplitude map. If $β>1$, we should be careful not to increase the PLC transmit power to above the upper limit that was established by the manufacturer for either regulatory or signal-quality reasons. Typically, the PLC node's factory-default amplitude map is the upper limit that we should heed.

Alternate Measurement: DSL QLN

Another embodiment of the invention measures PLC-to-DSL coupling by collecting and processing DSL quiet-line noise (QLN) measurements under various distinct PLC-transmission cases.

QLN is measured only while the DSL is training, so obtaining an up-to-date QLN measurement generally requires forcing the DSL to retrain. Retraining has the side effect of breaking the DSL connection for a significant amount of time. Despite this side effect, there may be circumstances where QLN is better to use than SNR.

QLN and any similar measurements of noise can be used almost directly in place of SNR, provided they are used in pairs. It turns out that the difference in two SNR measurements is identical to the negative of the difference of two QLN measurements made under identical conditions. That is:

$$D_{za} = SNR_z - SNR_a = -(QLN_z - QLN_a) \quad (29)$$

$$D_{za} = QLN_a - QLN_z \quad (30)$$

This can easily be proven. We express the two QLNs literally.

$$QLN_z \leftarrow H_z + B \quad (31)$$

$$QLN_a \leftarrow H_a + B \quad (32)$$

We take the difference of the two QLNs as in Equation (29). We note that subtraction in the dB domain corresponds to division in the linear domain, and that negation in the dB domain corresponds to reciprocation in the linear domain.

$$-(QLN_z - QLN_a) \leftarrow \left(\frac{H_z + B}{H_a + B}\right)^{-1} \quad (33)$$

$$-(QLN_z - QLN_a) \leftarrow \frac{H_a + B}{H_z + B} \quad (34)$$

Since the right sides of Equations (34) and (6) are identical, their left sides are equal, and Equation (29) is true.

The Tone Domains

PLC and DSL employ multi-tone modulation, but PLC tones are of different spacing than DSL tones. The tone spacing for the HomePlug AV ("HPAV") PLC protocol, for example, is approximately 24.4 kHz, but for DSL it is typically 4.3125 kHz. One HPAV tone spectrally spans a run of multiple DSL tones. Therefore, coupled power from one HPAV tone can degrade the SNRs of several DSL tones.

Measured DSL SNR is in the DSL-tone domain. On the other hand, the PLC amplitude map is in the PLC-tone domain. Therefore, somewhere between measuring DSL SNR and applying a new amplitude map, we must perform a conversion from the DSL-tone domain to the PLC-tone domain.

In one embodiment of the invention the conversion is performed "just in time", in the β vector. From β, which is in the DSL-tone domain, this embodiment derives a new vector, $β_P$, which is in the PLC-tone domain. For the typical case, where the DSL-tone spacing is less than the PLC-tone spacing, this embodiment keeps arithmetic in the finer-spaced, DSL-tone domain until the last step and thereby maximizes accuracy.

A method is needed for mapping the elements of β to the elements of $β_P$. It stands to reason that each element of $β_P$ should be computed as some weighting of some run of elements of β. Many mapping and weighting methods are possible. One embodiment uses the mapping and weighting methods described below.

Below, in the C language, is a mapping method according to one embodiment. Functions are from the standard "math.h" library.

define HZ_PER_I_PLC ((double) 1000000.0/40.96)
define HZ_PER_I_DSL ((double)4312.5)
int i_dsl_min;
int i_dsl_max;
int i_plc;
double spill_plc;

$i\_dsl\_min = ceil(((HZ\_PER\_I\_PLC/HZ\_PER\_I\_DSL)*$
$\quad (i\_plc-(0.5+spill\_plc)))-0.5);$ $i\_dsl\_max = floor(((HZ\_PER\_I\_PLC/HZ\_$
$\quad PER\_I\_DSL)*(i\_plc+(0.5+spill\_plc)))+0.5);$ The run of DSL tones of indices i_dsl_min through i_dsl_max is mapped to the PLC tone with index i_plc. This run of DSL tones is every DSL tone whose nominal spectrum overlaps, to any extent whatever, the nominal spectrum of the PLC tone and the spill_plc tones to its immediate left and right. Here, a tone's spectrum is assumed to be centered at the tone's nominal frequency and to be as wide as the tone spacing.

Below is a weighting method according to one embodiment:

$$β_P[i\_plc] = \min(β[i\_dsl\_min], \ldots, β[i\_dsl\_max])$$

$β_P$ is defined to be the minimum of all β in the run of DSL tones. The DSL tone most affected by the PLC tone determines the new scaling for that PLC tone. This weighting method is nonlinear.

Analysis, Part 2: Multiple PLC Transmitters

The formulae in the Analysis, Part 1 section above are for the case where one PLC node is transmitting while all other PLC nodes are silent. For reasons given in a subsequent section, that case is not always realizable. Multiple PLC transmitters may necessarily be active concurrently during some SNR measurements. It will be shown in this section that determining $\alpha_X$, and then β, for each PLC transmitter simply requires solving a system of equations.

We consider the case where the number of transmitters active concurrently is two, which is sufficient for the case where the PLC protocol is HomePlug AV and the chipset is the market leader.

First, we recall the basic SNR-difference equation for a solo transmitter:

$$SNR_z - SNR_a \equiv D_{za} \leftarrow \frac{\tau_a \alpha_X + 1}{\tau_z \alpha_X + 1} \quad (35)$$

Now, we consider two transmitters, numbered 1 and 2, and three SNR measurements at three transmit cases, named z, a, and b. We recall that each PLC transmitter has its own $\alpha_X$. We extend the formula above, and the result is the following pair of equations:

$$SNR_z - SNR_a \equiv D_{za} \leftarrow \frac{\tau_{a1}\alpha_{X1} + \tau_{a2}\alpha_{X2} + 1}{\tau_{z1}\alpha_{X1} + \tau_{z2}\alpha_{X2} + 1} \quad (36)$$

$$SNR_z - SNR_b \equiv D_{zb} \leftarrow \frac{\tau_{b1}\alpha_{X1} + \tau_{b2}\alpha_{X2} + 1}{\tau_{z1}\alpha_{X1} + \tau_{z2}\alpha_{X2} + 1} \quad (37)$$

We see that three SNR measurements, and suitably chosen, $\tau$ matrix, yield two independent equations of the two unknowns, $\alpha_{X1}$ and $\alpha_{X2}$. These equations are nonlinear in $\alpha_{Xn}$. The $\tau$ matrix has one row per transmit case and one column per PLC node:

$$\tau = \begin{bmatrix} \tau_{z1} & \tau_{z2} \\ \tau_{a1} & \tau_{a2} \\ \tau_{b1} & \tau_{b2} \end{bmatrix} \quad (38)$$

By induction, we conclude that N+1 SNR measurements, and suitably chosen (N+1)×N $\tau$ matrix, would yield N independent equations of the N unknowns, $\alpha_{X1}$ through $\alpha_{XN}$, and we would know by inspection how to write these equations.

We now consider the special case where the "z" measurement is made with zero duty cycle on all PLC transmitters. In this case, all $\tau_{zn}$ are zero. We drop the first row from the $\tau$ matrix:

$$\tau = \begin{bmatrix} \tau_{a1} & \tau_{a2} \\ \tau_{b1} & \tau_{b2} \end{bmatrix} \quad (39)$$

Equations (36) and (37) lose their denominators and become linear as a result. We drop the z's from the subscripts.

$$D_a \leftarrow \tau_{a1}\alpha_{X1} + \tau_{a2}\alpha_{X2} + 1 \quad (40)$$

$$D_b \leftarrow \tau_{b1}\alpha_{X1} + \tau_{b2}\alpha_{X2} + 1 \quad (41)$$

We transform the LHSs from the dB domain to the linear domain and rearrange:

$$\tau_{a1}\alpha_{X1} + \tau_{a2}\alpha_{X2} = 10^{\left(\frac{D_a}{10}\right)} - 1 \quad (42)$$

$$\tau_{b1}\alpha_{X1} + \tau_{b2}\alpha_{X2} = 10^{\left(\frac{D_b}{10}\right)} - 1 \quad (43)$$

We introduce shorthand $\alpha_a$ and $\alpha_b$:

$$\alpha_a \equiv 10^{\left(\frac{D_a}{10}\right)} - 1 \quad (44)$$

$$\alpha_b \equiv 10^{\left(\frac{D_b}{10}\right)} - 1 \quad (45)$$

We arrive at our system of equations:

$$\tau_{a1}\alpha_{X1} + \tau_{a2}\alpha_{X2} = \alpha_a \quad (46)$$

$$\tau_{b1}\alpha_{X1} + \tau_{b2}\alpha_{X2} = \alpha_b \quad (47)$$

Three SNR measurements, and suitably chosen $\tau$ matrix, yield two independent linear equations of the two unknowns, $\alpha_{X1}$ and $\alpha_{X2}$. By induction, we conclude that N+1 SNR measurements, and suitably chosen $\tau$ matrix, would yield a linear system of N independent equations of the N unknowns, $\alpha_{X1}$ through $\alpha_{XN}$.

By using standard algebra, we can solve Equations (46) and (47) for $\alpha_{X1}$ and $\alpha_{X2}$ in closed form:

$$\alpha_{X1} = \frac{\tau_{b2}\alpha_a - \tau_{a2}\alpha_b}{\tau_{a1}\tau_{b2} - \tau_{a2}\tau_{b1}} \quad (48)$$

$$\alpha_{X2} = \frac{\tau_{a1}\alpha_b - \tau_{b1}\alpha_a}{\tau_{a1}\tau_{b2} - \tau_{a2}\tau_{b1}} \quad (49)$$

Finally, we consider the special case where PLC Node 1 is capable of transmitting solo and is made to transmit solo during measurement "a", whereas Node 2 must transmit concurrently with Node 1 and does so during measurement "b". In this case, $\tau_{a2}=0$ and Equations (48) and (49) reduce to the following:

$$\alpha_{X1} = \frac{\alpha_a}{\tau_{a1}} \quad (50)$$

$$\alpha_{X2} = \frac{\alpha_b}{\tau_{b2}} - \frac{\tau_{b1}\alpha_a}{\tau_{b2}\tau_{a1}} \quad (51)$$

$\alpha_{X2}$ can optionally be expressed in terms of $\alpha_{X1}$:

$$\alpha_{X2} = \frac{\alpha_b - \tau_{b1}\alpha_{X1}}{\tau_{b2}} \quad (52)$$

For all cases detailed in this section, once we determine $\alpha_{Xn}$, we can easily apply Equation (26) to determine $\beta_n = \alpha_Y / \alpha_{Xn}$ for each of two or more PLC nodes that are transmitting concurrently.

Implementation

Figure 1:
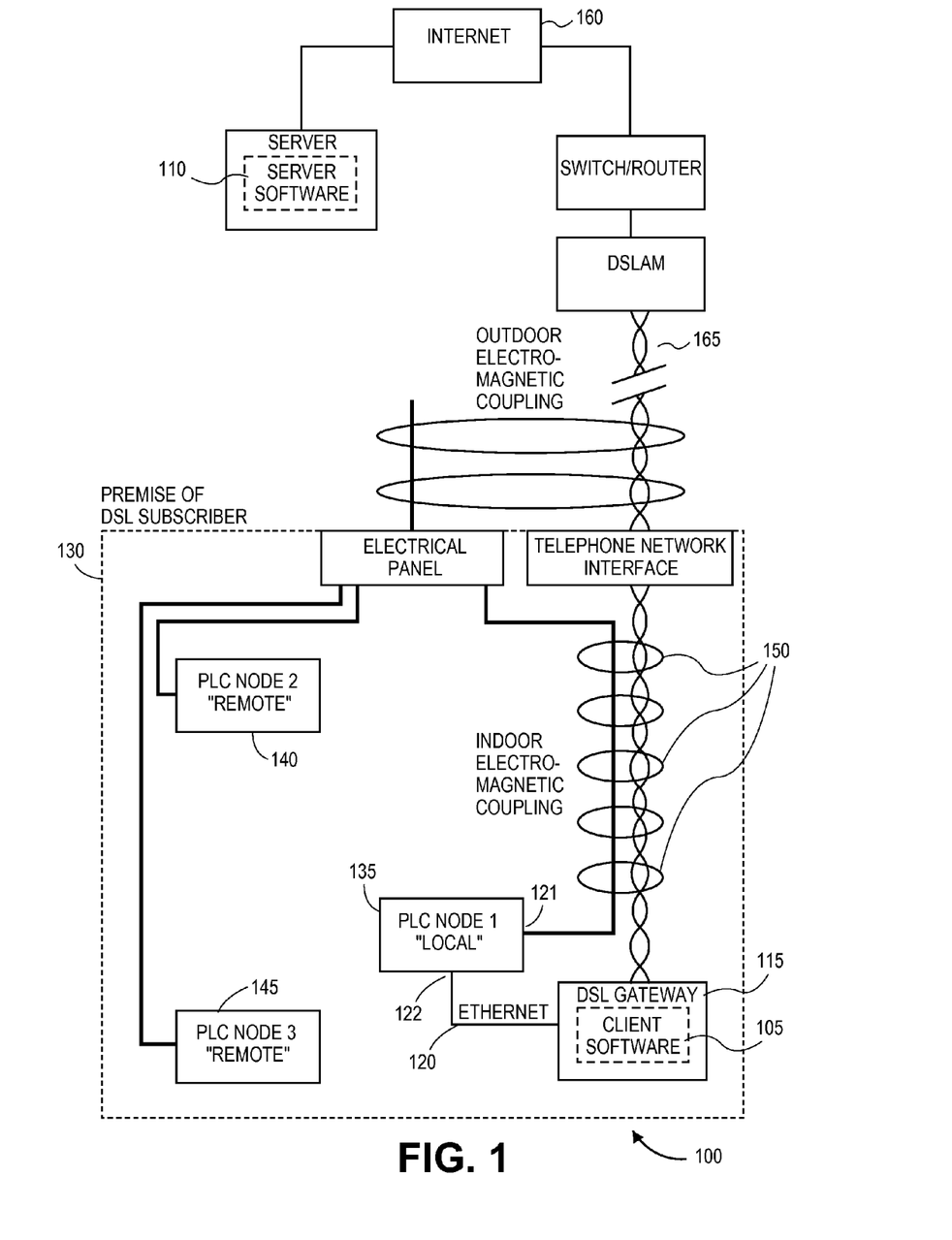
FIG. 1 illustrates an embodiment of the invention.

With reference to FIG. 1, embodiments of the invention may be implemented in software. The software implementation lends itself to partitioning across hardware platforms. Many partitioning arrangements are possible. For example, in one embodiment 100 of the invention, the software is partitioned over a on-premises Client 105 and an off-premises Server 110.

The Client software may run on some processor that is a node on the in-premise local area network 120. The processor may be, for example, the host processor of the premise's DSL gateway 115. The Client performs the following functions when appropriate:

It causes the PLC nodes to transmit at known relative power levels.

It optionally retrieves the SNR data, typically from the CPE.

It optionally computes the β's.

It reads and writes the PLC nodes' amplitude maps.

It exchanges commands and data with the Server.

The Server is a computing resource typically off-premises that may be shared by a plurality of clients. The Server performs the following functions when appropriate:

It orchestrates the Clients' actions.

It handles exceptional cases on behalf of the Clients.

It optionally retrieves the SNR data, typically from the DSLAM.

It optionally computes the β's.

It exchanges commands and data with the Clients.

The Server-side software may be integrated into a comprehensive network-management suite.

PLC transmissions at one premise 130 can potentially affect DSL at a neighboring premise (not shown in FIG. 1). Use of a Server conveniently enables embodiments of the invention to be extended to cross-premises mitigation. The Server can orchestrate the activities of Clients at neighboring premises.

Causing PLC Nodes to Transmit

There are three basic methods by which the Client 105 can cause PLC nodes 135, 140 and 145 to measure transmit for PLC-to-DSL coupling (depicted at 150):

Forward: This method causes solo transmission. It is available only to the local node 135. PLC nodes forward traffic between the modulated interface 121 and the host interface 122. If the PLC node is the "local node" 135, whose host interface 122 is connected to the Client, then the Client can cause this PLC node to transmit simply by generating artificial traffic that the PLC node naturally forwards to its modulated interface 121.

Respond: This method causes two PLC nodes to transmit concurrently. It is available to all of the remote nodes 140, 145. It causes the local node 135 to transmit as a side effect. PLC nodes typically implement a management protocol. If a node receives a management command over its modulated interface, it typically transmits a response to that command, on that interface. The Client can send a sequence of management commands via the local node to a remote PLC node, thereby soliciting a sequence of responses from that remote PLC node, and thereby causing that remote PLC node to transmit. This method unavoidably causes the local node to transmit as well, since the local node forwards the management commands from the Client.

Generate: This method causes solo transmission. It might be available only to the remote nodes. In some PLC protocols or chipsets, the PLC node implements a management command that causes the node to transmit solo at a controlled rate and duration of traffic on its modulated interface. This method, if available, causes solo transmission. The market-leading chipset for the HomePlug AV PLC protocol implements such a management command but its performance may be unsatisfactory. The maximum attainable duty cycle is about 8%, which may be too small for general use.

It is not sufficient merely to cause a PLC node to transmit. The PLC node needs to transmit at a known, approximately constant transmit power relative to the full power level prescribed by its amplitude map. As mentioned earlier, we prefer to do that by controlling the transmit duty cycle. We control duty cycle by (a) generating artificial traffic at a controlled bit rate and (b) controlling the modulation rate employed for the artificial traffic. The units of the modulation rate are bits per symbol.

Using the lowest available modulation rate minimizes the Client's burden in generating artificial traffic, because minimizing modulation rate maximizes the transmit duty cycle attained for a given bit rate of artificial traffic. We can force use of a low modulation rate by crafting the artificial traffic's frame headers such that the artificial traffic will naturally and unconditionally be sent at that low modulation rate. Management frames, broadcast frames, and frames to unknown destinations, for example, are typically sent at a low, constant modulation rate.

The Client can generate artificial traffic by sending a particular well-crafted frame repeatedly on a regulated interval, T. But however the Client generates the traffic, the Client must know with reasonable accuracy the transmit duty cycles that will result from that traffic. It is generally impossible or undesirable for the Client to measure duty cycles at runtime. Instead, duty cycles resulting from a given artificial-traffic frame and a given interval, T, can be predetermined by one of the following methods:

Calculated by in-depth PLC-protocol analysis. This method can be difficult.

Measured in the lab by measuring the timing of the PLC chipset's digital "transmit-enable" signal while the PLC chipset is transmitting the frame at interval T. This method may be more practical.

Avoiding Retrain

In premises where the coupling 150 is particularly strong, the artificial PLC traffic may impact the DSL sufficiently to cause the DSL to retrain. Unplanned retraining should be avoided, because it is time-consuming, disruptive to the user, and disruptive to the Client's connection to the Server.

Therefore, one embodiment of the invention ramps the τ upward while monitoring the present SNR relative to the SNR with no PLC transmission. It settles on the largest τ it deems it can use without causing retrain. Larger τ result in more-accurate differential SNR measurements and so are preferred over smaller τ.

An Example Embodiment

Setup

The Client 105 is a software module running in the host processor of the DSL gateway 115. Its actions are orchestrated by a Server 110, with which it communicates via the Internet 160, via the DSL connection 165 itself. There are three PLC nodes illustrated in FIG. 1, namely, nodes 135, 140 and 145. All employ the HomePlug AV protocol implemented on the Qualcomm Atheros' 6400 chipset, in one embodiment. Node 1 (135) is the local PLC node, connected by Ethernet 120 to the DSL gateway 115. Nodes 2 (140) through N (145) are the remote PLC nodes.

Steps:

1. Choose vector $D_Y > 0$. Calculate vector $\alpha_Y = 10^{\wedge}(D_Y/10) - 1$.
2. Ensure each PLC node's amplitude map is at factory default.
3. Set n=1.
4. Cause or wait for natural PLC traffic to become light.
5. Measure vector $SNR_z$.
6. Cause PLC node 1 to transmit solo at duty cycle $\tau_{a1}$, via the Forward method.
7. Measure vector $SNR_a$.
8. Cease causing PLC node 1 to transmit.

9. Calculate vector $\beta_1$.
10. Scale node 1's amplitude map by vector $\beta_1$.
11. Repeat steps 4 through 9 (inclusive) once.
12. Set n=n+1.
13. If n>N, then continue at step 21.
14. Cause or wait for natural PLC traffic to become light.
15. Measure vector $SNR_z$.
16. Cause PLC node n to transmit at duty cycle $\tau_{b2}$, via the Respond method. This parasitically causes PLC node 1 to transmit at duty cycle $T_{b1}$.
17. Measure vector $SNR_b$.
18. Cease causing PLC node n to transmit.
19. Calculate vector $\beta_n$
20. Continue at step 12.
21. For all PLC nodes n>1, scale node n's amplitude map by vector $\beta_n$.

Calculating $\beta_1$:
  Calculate vector $D_a$=max $(SNR_z-SNR_a, 0)$.
  Calculate vector $\alpha_a=10^{\wedge}(D_a/10)-1$.
  Calculate vector $\alpha_{X1}=\alpha_a/\tau_{a1}$.
  If $\alpha_{X1}>\alpha_Y$, then calculate $\beta_1=\alpha_Y/\alpha_{X1}$; otherwise, set $\beta_1=1$.

Calculating $\beta_n$:
  Calculate vector $D_b$=max $(SNR_z-SNR_b, 0)$.
  Calculate vector $\alpha_b=10^{\wedge}(D_b/10)-1$.
  Calculate vector $\alpha_{X2}=(\alpha_b-\tau_{b1}\times\alpha_{X1})/\tau_{b2}$.
  If $\alpha_{X2}>\alpha_Y$, then calculate $\beta_n=\alpha_Y/\alpha_{X2}$; otherwise, set $\beta_n=1$.

PLC Management Messages

PLC management messages, such as required to read and write the amplitude map or such as used in the "Respond" and "Generate" methods for artificial PLC transmission, are dependent on PLC protocol and chipset. Their documentation is generally divulged only by consent of either the chipset manufacturer or the organization that maintains the PLC protocol's specification. Details of management messages therefore cannot be disclosed here, in the public domain. However, details are generally available to anyone skilled in the art having commercial interest in developing PLC software, hardware, or systems.

CONCLUSION

In this description, numerous details have been set forth to provide a more thorough explanation of embodiments of the present invention. It should be apparent, however, to one skilled in the art, that embodiments of the present invention may be practiced without these specific details. In other instances, well-known structures and devices have been shown in block diagram form, rather than in detail, in order to avoid obscuring embodiments of the present invention.

Some portions of this detailed description are presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from this discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appear from the description herein. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

What is claimed is:
1. A method for reducing a power of a signal electromagnetically coupled from a power line communication (PLC) medium to a digital subscriber line (DSL) medium, comprising:
  transmitting a first data signal over the PLC medium at a first average power level from one of a plurality of PLC transmitters coupled to the PLC medium;
  measuring first noise associated with a first signal received at a DSL receiver coupled to the DSL communication medium caused at least in part by the data signal transmission over the PLC medium at the first average power level;
  transmitting a second data signal over the PLC medium at a second average power level from the one PLC transmitter, the second average power level being different than the first average power level;
  measuring second noise associated with a second signal received at the DSL receiver coupled to the DSL communication medium caused at least in part by the data signal transmission over the PLC medium at the second average power level; and changing a transmit power spectral density (PSD) for a data signals transmitted by the one PLC transmitter over the PLC medium, based on a difference between the first noise and the second noise, such that the changed transmit PSD for the data signals transmitted by the one PLC transmitter over the PLC medium reduces the power of the signal electromagnetically coupled from the PLC medium to the DSL medium caused by the data signal transmissions from the one PLC transmitter over the PLC medium.

2. The method of claim 1, wherein changing the transmit power spectral density (PSD) for the data signals transmitted by the one PLC transmitter comprises: adjusting a vector that specifies a nominal transmit power for the data signal.

3. The method of claim 1, wherein transmitting of the first data signal over the PLC medium at a first average power level from the one PLC transmitter and transmitting of the second data signal over the PLC medium at a second average power level from the one PLC transmitter comprises:
   transmitting the first and second data signals at first and second average power levels, respectively, wherein the first and second average power levels are substantially greater than a combined power output of all other data signals concurrently transmitted by PLC transmitters in the plurality of PLC transmitters.

4. The method of claim 1, wherein the first average power level is a maximum average power level at which the one PLC transmitter transmits the data signal.

5. The method of claim 1, wherein transmitting of the first data signal over the PLC medium at a first average power level from the one PLC transmitter and transmitting of the second data signal over the PLC medium at a second average power level from the one PLC transmitter comprises:
   regulating a transmit duty cycle of the one PLC transmitter to transmit the first data signal over the PLC medium at a first average power level and to transmit the second data signal over the PLC medium at a second average power level.

6. The method of claim 1, wherein transmitting of the first data signal over the PLC medium at a first average power level from the one PLC transmitter and transmitting of the second data signal over the PLC medium at a second average power level from the one PLC transmitter comprises:
   adjusting a first nominal transmit power at which to transmit a one, or a group of adjacent ones, of a plurality of PLC tones comprising the first data signal from the PLC transmitter and then adjusting a second nominal transmit power at which to transmit a one, or a group of adjacent ones, of a plurality of PLC tones comprising the second data signal from the PLC transmitter.

7. The method of claim 1, wherein the DSL receiver is a customer premises equipment (CPE) DSL receiver, and wherein the first or second signal received at a DSL receiver is a downstream signal received at the CPE DSL receiver.

8. The method of claim 1, wherein measuring the first noise and measuring the second noise comprises:
   measuring a first signal to noise ratio (SNR) and measuring a second SNR.

9. The method of claim 1, wherein measuring the first noise and measuring the second noise comprises:
   measuring a first DSL quiet-line noise (QLN); and measuring a second QLN.

10. A non-transitory computer-readable medium containing instructions and data that when accessed cause a programmable processor to perform operations that reduce a power of a signal electromagnetically coupled from a PLC power line communication (PLC) medium to a digital subscriber line (DSL) medium, the operations comprising:
    transmitting a first data signal over the PLC medium at a first average power level from one of a plurality of PLC transmitters coupled to the PLC medium;
    measuring first noise associated with a first signal received at a DSL receiver coupled to the DSL communication medium caused at least in part by the data signal transmission over the PLC medium at the first average power level;
    transmitting a second data signal over the PLC medium at a second average power level from the one PLC transmitter, the second average power level being different than the first average power level;
    measuring second noise associated with a second signal received at the DSL receiver coupled to the DSL communication medium caused at least in part by the data signal transmission over the PLC medium at the second average power level; and
    changing a transmit power spectral density (PSD) for a data signals transmitted by the one PLC transmitter over the PLC medium, based on a difference between the first noise and the second noise, such that the changed transmit PSD for the data signals transmitted by the one PLC transmitter over the PLC medium reduces the power of the signal electromagnetically coupled from the PLC medium to the DSL medium caused by the data signal transmissions from the one PLC transmitter over the PLC medium.

11. The non-transitory computer-readable medium of claim 10, wherein changing the transmit power spectral density (PSD) for the data signals transmitted by the one PLC transmitter comprises:
    adjusting a vector that specifies a nominal transmit power for the data signals.

12. The non-transitory computer-readable medium of claim 10, wherein transmitting of the first data signal over the PLC medium at a first average power level from the one PLC transmitter and transmitting of the second data signal over the PLC medium at a second average power level from the one PLC transmitter comprises:
    transmitting the first and second data signals at first and second average power levels, respectively, wherein the first and second average power levels are substantially greater than a combined power output of all other data signals concurrently transmitted by PLC transmitters in the plurality of PLC transmitters.

13. The non-transitory computer-readable medium of claim 10, wherein the transmitting of the data signal over the PLC medium at a first average power level from the one PLC transmitter and the transmitting of the data signal over the PLC medium at a second average power level from the one PLC transmitter comprises:
    regulating a transmit duty cycle of the one PLC transmitter to transmit the data signal over the PLC medium at a first average power level and to transmit the data signal over the PLC medium at a second average power level.

14. An apparatus for reducing a power of a signal electromagnetically coupled from a PLC power line communication (PLC) medium to a digital subscriber line (DSL) medium, comprising:
    one of a plurality of PLC transmitters coupled to the PLC medium to transmit a first data signal over the PLC medium at a first average power level;
    a node coupled to the DSL medium to measure a first noise associated with a first signal received at a DSL receiver coupled to the DSL communication medium caused at least in part by the first data signal transmission over the PLC medium at the first average power level;

wherein the one PLC transmitter is to further transmit a second data signal over the PLC medium at a second average power level, the second average power level being different than the first average power level;

wherein the node is to further measure a second noise associated with a second signal received at the DSL receiver coupled to the DSL communication medium caused at least in part by the second data signal transmission over the PLC medium at the second average power level; and a network management node to change a transmit power spectral density (PSD) for a data signals transmitted by the one PLC transmitter over the PLC medium, based on a difference between the first noise and the second noise, such that the changed transmit PSD for the data signals transmitted by the one PLC transmitter over the PLC medium reduces the power of the signal electromagnetically coupled from the PLC medium to the DSL medium caused by the data signal transmissions from the one PLC transmitter over the PLC medium.

15. The apparatus of claim 14, wherein the network management node is to change the transmit power spectral density (PSD) for the data signal transmitted by the one PLC transmitter by adjusting a vector that specifies a nominal transmit power for the data signals.

16. The apparatus of claim 14, wherein the one PLC transmitter is to transmit the first data signal over the PLC medium at a first average power level and is to transmit the second data signal over the PLC medium at a second average power level by transmitting the first and second data signals at first and second average power levels, respectively, wherein the first and second average power levels are substantially greater than a combined power output of all other data signals concurrently transmitted by other PLC transmitters in the plurality of PLC transmitters.

17. The apparatus of claim 14, wherein the first average power level is a maximum average power level at which the one PLC transmitter is to transmit the data signal.

18. The apparatus of claim 14, wherein the one PLC transmitter is to transmit the first data signal over the PLC medium at a first average power level and is to transmit the second data signal over the PLC medium at a second average power level by regulating a transmit duty cycle of the one PLC transmitter to transmit the first data signal over the PLC medium at a first average power level and to transmit the second data signal over the PLC medium at a second average power level.

19. The apparatus of claim 14, wherein the PLC transmitter is to transmit the first data signal over the PLC medium at a first average power level and is to transmit the second data signal over the PLC medium at a second average power level by adjusting a first nominal transmit power at which to transmit a one, or a group of adjacent ones, of a plurality of PLC tones comprising the first data signal and then adjusting a second nominal transmit power at which to transmit a one, or a group of adjacent ones, of a plurality of PLC tones comprising the second data signal.

20. The apparatus of claim 14, wherein the DSL receiver is a customer premises equipment (CPE) DSL receiver, and wherein the first or second signal received at a DSL receiver is a downstream signal received at the CPE DSL receiver.

21. The apparatus of claim 14, wherein the PLC medium, the plurality of PLC transmitters, the DSL medium, and the DSL receiver, are located in a premise of a DSL subscriber.

\* \* \* \* \*